United States Patent
Kimura (10) Patent No.: US 9,604,170 B2
(45) Date of Patent: Mar. 28, 2017

(54) EXHAUST GAS PURIFICATION DEVICE

(71) Applicant: Hino Motors, Ltd., Hino-shi (JP)

(72) Inventor: Masahiro Kimura, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 18 days.

(21) Appl. No.: 14/371,882

(22) PCT Filed: Nov. 13, 2012

(86) PCT No.: PCT/JP2012/079366
§ 371 (c)(1),
(2) Date: Jul. 11, 2014

(87) PCT Pub. No.: WO2013/105336
PCT Pub. Date: Jul. 18, 2013

(65) Prior Publication Data
US 2015/0020484 A1    Jan. 22, 2015

(30) Foreign Application Priority Data

Jan. 12, 2012    (JP) ................................ 2012-004138

(51) Int. Cl.
*B01D 50/00*    (2006.01)
*B01D 59/00*    (2006.01)
(Continued)

(52) U.S. Cl.
CPC .......... *B01D 45/16* (2013.01); *B01F 3/04049* (2013.01); *B01F 5/0065* (2013.01);
(Continued)

(58) Field of Classification Search
CPC .... B01D 45/16; B01F 3/04049; B01F 5/0065; B01F 5/0451; F01N 3/035;
(Continued)

(56) References Cited

U.S. PATENT DOCUMENTS 8,397,492 B2 *   3/2013   Kowada .............. B01F 3/04049
                                                                60/295
8,813,481 B2 *   8/2014   Kowada ............. B01D 53/9431
                                                                60/295
(Continued)

FOREIGN PATENT DOCUMENTS

CN          101815851 A       8/2010
EP          2 295 756 A1      3/2011
(Continued)

OTHER PUBLICATIONS

International Preliminary Report on Patentability and Written Opinion issued Jul. 24, 2014 in PCT/JP2012/079366.
(Continued)

*Primary Examiner* — Amber R Orlando
(74) *Attorney, Agent, or Firm* — Oblon, McClelland, Maier & Neustadt, L.L.P.

(57) ABSTRACT

An exhaust gas purification device including: a tube-shaped casing; a pipe that is disposed at the downstream side of the casing, is inserted into the casing so as to extend in a direction substantially perpendicular to the axial direction of the casing, and is provided with a through-hole communicating with the casing; a guide member that guides the exhaust gas inside the casing to the through-hole; and an injection device that injects a reduction agent from an upstream end of the pipe into the pipe. Then, the guide member includes a turning guide member that guides the exhaust gas to the through-hole from the tangential direction of the pipe so as to generate a swirl flow inside the pipe and a protecting guide member that covers the upstream side of an injection area of the reduction agent in the axial direction of the casing.

5 Claims, 4 Drawing Sheets

(51) Int. Cl.
  *B01D 45/16* (2006.01)
  *F01N 3/20* (2006.01)
  *F01N 3/28* (2006.01)
  *F01N 3/035* (2006.01)
  *B01F 5/00* (2006.01)
  *B01F 5/04* (2006.01)
  *B01F 3/04* (2006.01)
  *F01N 3/08* (2006.01)
  *F01N 13/00* (2010.01)
  *F01N 3/10* (2006.01)

(52) U.S. Cl.
  CPC ............ *B01F 5/0451* (2013.01); *F01N 3/035* (2013.01); *F01N 3/08* (2013.01); *F01N 3/2066* (2013.01); *F01N 3/2892* (2013.01); *F01N 3/10* (2013.01); *F01N 13/009* (2014.06); *F01N 2240/20* (2013.01); *F01N 2250/02* (2013.01); *F01N 2470/02* (2013.01); *F01N 2610/02* (2013.01); *Y02T 10/24* (2013.01)

(58) Field of Classification Search
  CPC ........ F01N 3/08; F01N 3/2066; F01N 3/2892; F01N 13/009; F01N 3/10; F01N 2240/20; F01N 2250/02; F01N 2470/02; F01N 2610/02; Y02T 10/24
  See application file for complete search history.

(56) References Cited

U.S. PATENT DOCUMENTS

| | | | |
|---|---|---|---|
| 9,062,589 B2* | 6/2015 | Katou | F01N 3/106 |
| 2009/0094964 A1 | 4/2009 | Fujita et al. | |
| 2009/0158717 A1 | 6/2009 | Kimura et al. | |
| 2009/0313979 A1 | 12/2009 | Kowada | |
| 2010/0146950 A1 | 6/2010 | Hayashi et al. | |
| 2010/0257850 A1* | 10/2010 | Kowada | F01N 3/2066 60/297 |
| 2011/0061374 A1 | 3/2011 | Noritake | |
| 2011/0094206 A1 | 4/2011 | Liu et al. | |
| 2011/0113758 A1 | 5/2011 | Perrot et al. | |
| 2011/0308234 A1* | 12/2011 | De Rudder | B01F 3/04049 60/295 |
| 2012/0144812 A1* | 6/2012 | Hyun | B01F 3/04049 60/301 |
| 2012/0324872 A1* | 12/2012 | Jaruvatee | B01F 5/0471 60/317 |
| 2013/0064725 A1 | 3/2013 | Kageyama et al. | |
| 2015/0020484 A1 | 1/2015 | Kimura | |

FOREIGN PATENT DOCUMENTS

| | | | | |
|---|---|---|---|---|
| EP | 2 607 641 A1 | 6/2013 | | |
| GB | 2 381 218 A | 4/2003 | | |
| JP | 2-223624 A | 9/1990 | | |
| JP | 2006-329019 A | 12/2006 | | |
| JP | 2008-215286 A | 9/2008 | | |
| JP | 2009-97435 A | 5/2009 | | |
| JP | 2009-103019 A | 5/2009 | | |
| JP | 2009-150338 A | 7/2009 | | |
| JP | 2009-156073 A | 7/2009 | | |
| JP | 2009-228484 A | 10/2009 | | |
| JP | WO 2009144766 A1 * | 12/2009 | ......... | B01F 3/04049 |
| JP | 2010-84700 A | 4/2010 | | |
| JP | 2011-99390 A | 5/2011 | | |
| JP | 2012-122469 A | 6/2012 | | |
| JP | 2013-7379 A | 1/2013 | | |
| WO | WO 2008/102560 A1 | 8/2008 | | |
| WO | WO 2011/110885 A1 | 9/2011 | | |
| WO | WO 2011/148806 A1 | 12/2011 | | |
| WO | WO 2013/105336 A1 | 7/2013 | | |

OTHER PUBLICATIONS

International Search Report issued Feb. 19, 2013 in PCT/JP2012/079366.
Office Action mailed May 7, 2015, in co-pending U.S. Appl. No. 14/416,949.
Extended European Search Report issued Aug. 14, 2015 in Patent Application No. 12865222.9.
U.S. Office Action mailed Sep. 11, 2015 in co-pending U.S. Appl. No. 14/416,949.
U.S. Appl. No. 14/416,949, filed Jan. 23, 2015, Kimura.
Combined Chinese Office Action and Search Report issued May 17, 2016 in Patent Application No. 201380039295.7 (with English translation of Categories of Documents).
Extended European Search Report issued on Jun. 6, 2016 in Patent Application No. 13822687.3.
International Preliminary Report on Patentability and Written Opinion issued Feb. 5, 2015 in PCT/JP2013/069002.

* cited by examiner

EXHAUST GAS PURIFICATION DEVICE

TECHNICAL FIELD

The present invention relates to an exhaust gas purification device.

BACKGROUND ART

Hitherto, a device disclosed in, for example, Patent Literature 1 has been known as an exhaust gas purification device that purifies an exhaust gas flowing through an exhaust passage of an engine. The exhaust gas purification device disclosed in Patent Literature 1 includes a first casing that stores a DOC (Diesel Oxidation Catalyst) and a DPF (Diesel Particulate Filter), a pipe that is equipped with an injection nozzle (an injection device) that injects urea water (reduction agent) into the exhaust gas, and a second casing that stores an SCR (Selective Catalytic Reduction), where the pipe is inserted into the first casing so as to extend in a direction substantially perpendicular to the axial direction of the first casing and is connected to the second casing. Then, NOx of the exhaust gas is purified by the reduction using ammonia produced by the injection of the urea water.

CITATION LIST

Patent Literature

[Patent Literature 1] JP 2009-228484 A
[Patent Literature 2] JP 2009-150338 A

SUMMARY OF INVENTION

Technical Problem

However, in the exhaust gas purification device disclosed in Patent Literature 1, the reduction agent injected into the pipe is not sufficiently diffused, and hence a satisfactory reduction reaction may not be obtained.

Therefore, a configuration is considered in which a partition plate of an exhaust gas purification device disclosed in Patent Literature 2 is attached to the exhaust gas purification device disclosed in Patent Literature 1. Since the partition plate promotes the diffusion of the reduction agent in order to obtain the satisfactory reduction reaction, the partition plate guides the exhaust gas so as to generate a swirl flow in the exhaust gas.

However, since the exhaust gas purification device disclosed in Patent Literature 1 and the exhaust gas purification device disclosed in Patent Literature 2 have a different connection structure between the first casing and the pipe, the partition plate of the exhaust gas purification device disclosed in Patent Literature 2 may not be attached to the exhaust gas purification device disclosed in Patent Literature 1. Further, since the partition plate of the exhaust gas purification device disclosed in Patent Literature 2 is made only in consideration of generating the swirl flow in the exhaust gas, the exhaust gas directly flows into an injection area of the reduction agent. As a result, the reduction agent adheres to the partition plate or an inner wall surface of the exhaust passage by the flow of the exhaust gas, and hence there is a concern that the reduction agent may not be sufficiently diffused.

One aspect of the invention is made in view of the above-described circumstances, and an object thereof is to provide an exhaust gas purification device capable of sufficiently diffusing a reduction agent.

Solution to Problem

An exhaust gas purification device according to one aspect of the invention is an exhaust gas purification device that purifies an exhaust gas flowing through an exhaust passage of an engine, the exhaust gas purification device including: a tube-shaped casing; a pipe disposed at a downstream side of the casing, inserted into the casing so as to extend in a direction substantially perpendicular to an axial direction of the casing, and is provided with a through-hole communicating with the casing; a guide member for guiding the exhaust gas inside the casing to the through-hole; and an injection device for injecting into the pipe a reduction agent from an upstream end of the pipe, wherein the guide member includes a turning guide member guiding the exhaust gas to the through-hole from a tangential direction of the pipe so as to generate a swirl flow inside the pipe and a protecting guide member covering an upstream side of an injection area of the reduction agent in the axial direction of the first casing.

According to the exhaust gas purification device of one aspect of the invention, the exhaust gas flowing through the casing flows from the through-hole of the pipe into the pipe. At this time, since the swirl flow is generated in the exhaust gas by the turning guide member, the reduction agent injected from the injection device may be diffused. Further, since it is possible to suppress the exhaust gas from directly entering the reduction agent injection area by the protecting guide member, it is possible to suppress a problem in which the reduction agent injected from the injection device flows by the flow of the exhaust gas so that the reduction agent adheres to the inner wall surface of the pipe. Accordingly, it is possible to sufficiently diffuse the reduction agent.

In this case, the through-hole may be formed at two facing positions, and the turning guide member may guide the exhaust gas to the through-holes so as to generate inside the pipe the swirl flows in the same direction. With such a configuration, since a sufficient opening area may be ensured compared to the case where the through-hole is formed at one position, the pressure (back pressure) of the exhaust gas may be reduced. In addition, since the exhaust gas is guided to the pair of through-holes by the turning guide members, the swirl flows may be generated in the same direction inside the pipe, and hence the swirl flow generated in the exhaust gas may be promoted. Accordingly, the reduction agent diffusion efficiency may be improved.

Further, the through-holes may be formed at the upstream side of a matching position between the injection area of the reduction agent injected from the injection device and an inner wall surface of the pipe. With such a configuration, since it is possible to generate the swirl flow so as to surround the reduction agent injection area by the exhaust gas flowing into the pipe, it is possible to further diffuse the reduction agent. Further, since it is possible to generate the swirl flow in the exhaust gas by causing the exhaust gas to flow into the pipe from the further upstream side, it is possible to diffuse the reduction agent directly after the injection.

Advantageous Effects of Invention

According to one aspect of the invention, it is possible to sufficiently diffuse the reduction agent.

BRIEF DESCRIPTION OF DRAWINGS

FIG. 2(a) is a cross-sectional view taken along the line II-II of FIG. 1 and FIG. 2(b) is a perspective view visibly illustrating a connection portion between a first casing and a pipe.

DESCRIPTION OF EMBODIMENTS

Hereinafter, a preferred embodiment of the invention will be described in detail by referring to the drawings. Furthermore, the same reference numeral will be given to the same or equivalent component in the description below, and the repetitive description thereof will not be presented.

Figure 1:
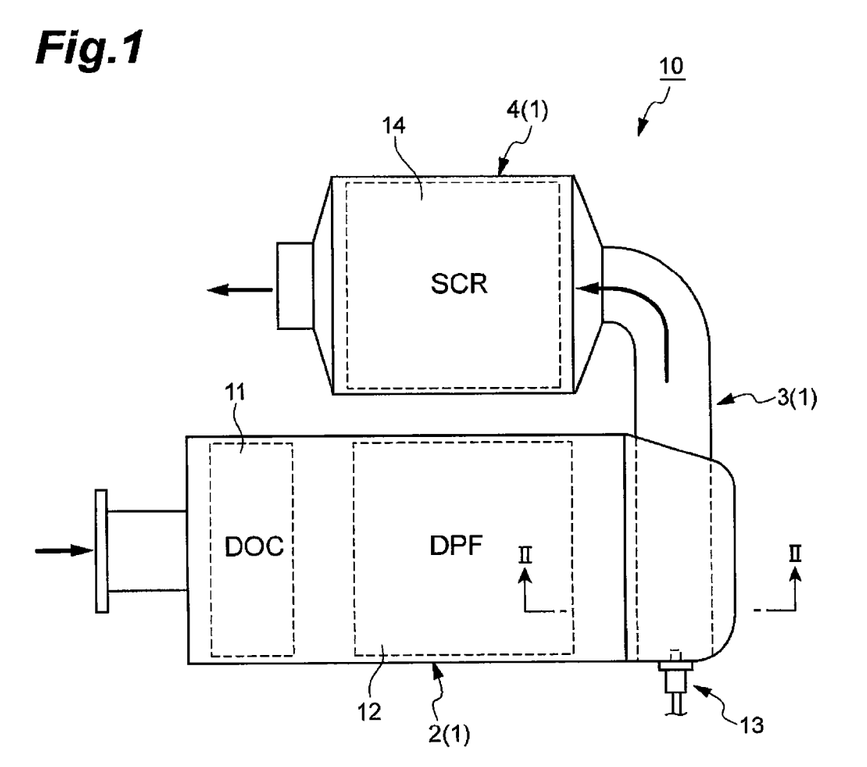
FIG. 1 is a view illustrating a schematic configuration of an exhaust gas purification device according to an embodiment of the invention.

FIG. 1 is a view illustrating a schematic configuration of an exhaust gas purification device according to an embodiment. As illustrated in FIG. 1, an exhaust gas purification device 10 of the embodiment is used to purify an exhaust gas (hereinafter, simply referred to as an "exhaust gas") discharged from an engine such as a diesel engine in, for example, a vehicle such as a truck. The exhaust gas purification device 10 is mounted on an exhaust passage 1 through which the exhaust gas circulates, and includes a DOC 11, a DPF 12, an injection device 13, and an SCR 14.

The exhaust passage 1 is partitioned by at least a first casing 2, a pipe (wall portion) 3, and a second casing 4 which are disposed in order from the upstream side toward the downstream side. The first casing 2 and the second casing 4 are formed in a tube shape, and are provided in series so that the exhaust gas flow directions are substantially parallel to each other. The pipe 3 connects the downstream side of the first casing 2 to the upstream side of the second casing 4. The pipe 3 extends straightly in a direction substantially perpendicular to the length direction of the first casing 2, and extends so as to be curved toward the upstream side of the second casing 4.

The DOC 11 is disposed at the upstream side inside the first casing 2 so as to perform an oxidation treatment on an unburned fuel fraction in the exhaust gas. The DPF 12 is used to trap particulates (particulate substance) in the exhaust gas passing through the DOC 11, and is disposed at the downstream side of the DOC 11 inside the first casing 2.

The injection device 13 is used to add a reduction agent to the exhaust gas directly after passing through the DPF 12 by injection. The injection device 13 herein produces ammonia by causing a thermal decomposition reaction and a hydrolysis reaction illustrated in the following equation (1) in a manner such that urea water is injected as the reduction agent.

$(NH_2)_2CO \rightarrow NH_3 + HNCO$ (Thermal decomposition reaction)

$HNCO + H_2O \rightarrow NH_3 + CO_2$ (Hydrolysis reaction) (1)

The SCR 14 is used to purify the exhaust gas by selectively causing a reduction reaction of NOx in the exhaust gas by the use of the added reduction agent. The SCR 14 is disposed inside the second casing 4. The SCR 14 herein selectively reduces and purifies NOx by causing a reduction reaction illustrated in the following equation (2) by the use of the produced ammonia. Furthermore, the rear stage of the second casing 4 is provided with an ammonia reduction catalyst (not illustrated) that performs an oxidation treatment on extra ammonia.

$4NO + 4NH_3 + O_2 \rightarrow 4N_2 + 6H_2O$ (Standard)

$6NO_2 + 8NH_3 \rightarrow 7N_2 + 12H_2O$ (Slow)

$NO + NO_2 + 2NH_3 \rightarrow 2N_2 + 3H_2O$ (Fast) (2)

Figure 2:
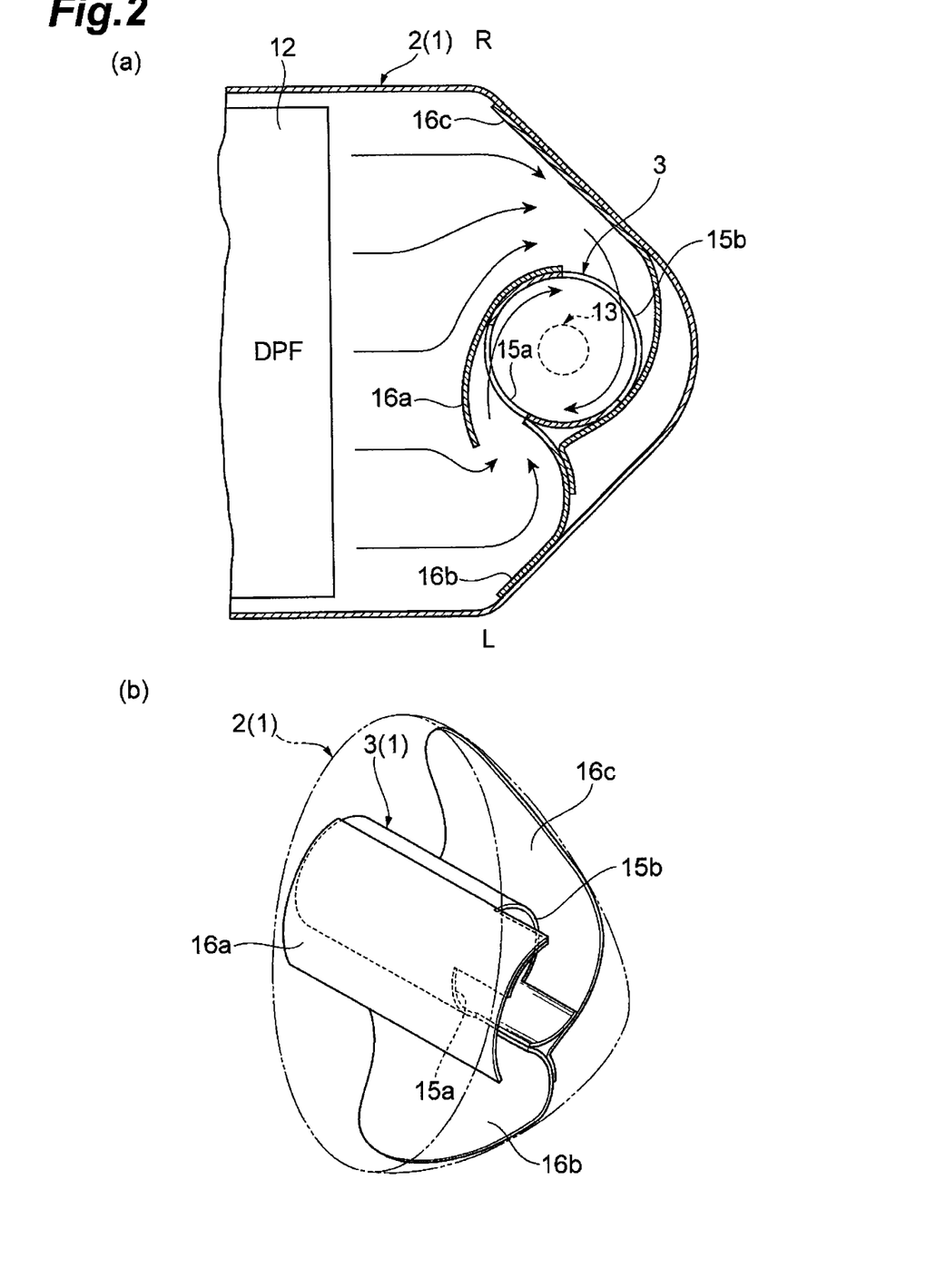
FIG. 2 is a view illustrating a main part of the exhaust gas purification device of FIG. 1, where
Figure 3:
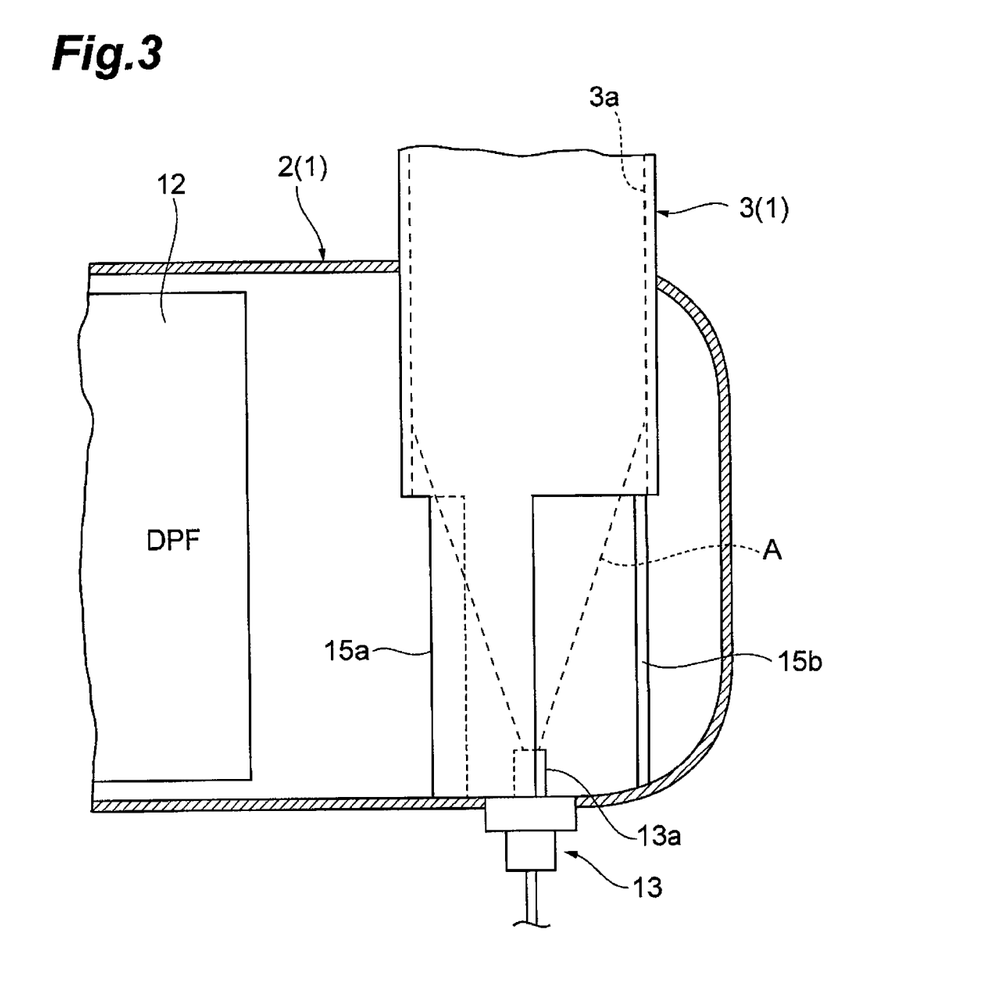
FIG. 3 is a partially enlarged view of the exhaust gas purification device of FIG. 1.

Next, a main part of the exhaust gas purification device 10 will be described in detail by referring to FIGS. 2 and 3. FIG. 2 is a view illustrating a main part of the exhaust gas purification device of FIG. 1, where FIG. 2(a) is a cross-sectional view taken along the line II-II illustrated in FIG. 1, and FIG. 2(b) is a perspective view visibly illustrating a connection portion between the first casing and the pipe. FIG. 3 is a partially enlarged view of the exhaust gas purification device of FIG. 1. Furthermore, for convenience of description, the upper side of FIG. 2(a) is set as the right side, and the lower side of FIG. 2(a) is set as the left side.

As illustrated in FIGS. 2 and 3, the upstream side of the pipe 3 is inserted into the downstream side of the DPF 12 in the first casing 2. The upstream side of the pipe 3 inserted into the first casing 2 extends in a direction substantially perpendicular to the axial direction of the first casing 2 so that the exhaust gas flow direction is substantially perpendicular to the first casing 2. Further, the upstream opening end of the pipe 3 is blocked by the wall surface of the first casing 2. Furthermore, the axial direction of the first casing 2 corresponds to the right and left direction of FIG. 2(a).

The injection device 13 is attached to the upstream end of the pipe 3 so that the reduction agent is injected from the upstream end of the pipe 3 in the extension direction of the pipe 3. The injection device 13 is used to inject the reduction agent into the pipe 3. In other words, the pipe 3 includes an injection area A of the reduction agent injected from the injection device 13. In the injection device 13 herein, a nozzle 13a is located at the center axis of the pipe 3, and injects the reduction agent toward the downstream side based on the center axis position of the pipe 3.

The upstream side of the pipe 3 inserted into the first casing 2 is provided with a pair of through-holes 15a and 15b into which the exhaust gas flows. Each of the through-holes 15a and 15b is a rectangular through-hole that penetrates the pipe 3 from the inside to the outside thereof.

As illustrated in FIG. 3, the through-holes 15a and 15b are formed at the upstream side in relation to the matching position between the injection area A of the reduction agent injected from the injection device 13 and an inner wall surface 3a of the pipe 3. Furthermore, the injection area A has a substantially conical silhouette in which the injection device 13 is the tip. The injection area A may be obtained geometrically based on, for example, the injection angle of the reduction agent injected from the injection device 13.

Further, the through-holes 15a and 15b are formed at facing positions. That is, the through-hole 15a is formed at the side of the DPF 12 in the pipe 3, and the through-hole 15b is formed at the opposite side to the DPF 12 in the pipe 3. Furthermore, when the first casing 2 is viewed from the upstream side toward the downstream side in the axial direction thereof, the reduction agent injection area A is visible from the through-hole 15a formed at the side of the DPF 12 in the pipe 3.

Here, as illustrated in FIG. 2, the exhaust gas purification device 10 of the embodiment includes guide members 16a, 16b, and 16c that divide the first casing 2 at the downstream side of the DPF 12 and guide the exhaust gas inside the first casing 2 to the through-holes 15a and 15b.

The guide member 16a is used to cover the upstream side of the reduction agent injection area A in the axial direction of the first casing 2 and to guide the exhaust gas to the through-hole 15a from the tangential direction of the pipe 3 so as to generate a swirl flow inside the pipe 3. The guide member 16a is a plate-shaped member that is curved so that the upstream side thereof is convex and the downstream side thereof is concave. Furthermore, in the guide member 16a, the upstream surface that is curved in a convex shape becomes the outer peripheral surface, and the downstream surface that is curved in a concave shape becomes the inner peripheral surface. The guide member 16a is connected to the right side of the through-hole 15a in the circumferential direction of the pipe 3 when viewed from the injection direction of the injection device 13, and extends while being expanded to the left side in the circumferential direction of the pipe 3 when viewed from the injection direction of the injection device 13. That is, the guide member 16a covers the through-hole 15a from the upstream side of the through-hole 15a in the axial direction of the first casing 2 so that the diameter decreases as it goes toward the right side in the circumferential direction of the pipe 3 when viewed from the injection direction of the injection device 13.

Since the guide member 16b guides the exhaust gas flowing along the right side of the guide member 16a toward the inner peripheral surface of the guide member 16a, the exhaust gas is guided from the tangential direction of the pipe 3 to the through-hole 15a so as to generate the swirl flow inside the pipe 3. The guide member 16b is a plate-shaped member that is curved so that the upstream side thereof is concave and the downstream side thereof is concave. Furthermore, in the guide member 16b, the upstream surface that is curved in a concave shape becomes the inner peripheral surface. Both ends of the guide member 16b are connected to the inner wall of the first casing 2 as the left side of the pipe 3 and the left side of the through-hole 15a in the circumferential direction of the pipe 3 when viewed from the injection direction of the injection device 13.

The guide member 16c is used to guide the exhaust gas from the tangential direction of the pipe 3 to the through-hole 15b so as to generate a swirl flow inside the pipe 3. The guide member 16c is a plate-shaped member that is curved so that the upstream side thereof is concave and the downstream side thereof is concave. Furthermore, in the guide member 16c, the upstream surface that is curved in a concave shape becomes the inner peripheral surface. The guide member 16c is connected to the right side of the through-hole 15b in the circumferential direction of the pipe 3 when viewed from the injection direction of the injection device 13, and extends while being expanded toward the left side in the circumferential direction of the pipe 3 when viewed from the injection direction of the injection device 13 so as to be connected to the inner wall of the first casing 2 as the right side of the pipe 3. That is, the guide member 16c covers the through-hole 15b so that the diameter decreases as it goes toward the right side in the circumferential direction of the pipe 3 when viewed from the injection direction of the injection device 13.

As illustrated in FIG. 1, in the exhaust gas purification device 10 with the above-described configuration, an oxidation treatment is first performed on the exhaust gas from the engine by the DOC 11 inside the first casing 2, and the particulates inside the exhaust gas are trapped by the DPF 12. Then, as illustrated in FIG. 2(a), the exhaust gas is guided by the guide members 16a, 16b, and 16c directly after passing through the DPF 12, flows from the through-holes 15a and 15b into the pipe 3, and flows so as to be substantially bent in the perpendicular direction by the pipe 3.

At this time, since the guide member 16a covers the upstream side of the reduction agent injection area A in the axial direction of the first casing 2, the exhaust gas that flows toward the guide member 16a is divided into the right and left sides of the pipe 3 so as to bypass the through-hole 15a by the guide of the guide member 16a, and flows toward the guide member 16b and the guide member 16c.

The exhaust gas that flows toward the guide member 16b flows toward the inner peripheral surface of the guide member 16a by the guide of the inner peripheral surface of the guide member 16b, and flows into the pipe 3 through the through-hole 15a from the tangential direction of the pipe 3 by the guide of the inner peripheral surface of the guide member 16a. For this reason, the exhaust gas that flows into the pipe 3 through the through-hole 15a turns rightward when viewed from the injection direction of the injection device 13.

The exhaust gas that flows toward the guide member 16c flows into the pipe 3 through the through-hole 15b from the tangential direction of the pipe 3. For this reason, the exhaust gas that flows into the pipe 3 through the through-hole 15b turns rightward when viewed from the injection direction of the injection device 13 as in the exhaust gas that flows into the pipe 3 through the through-hole 15a.

The exhaust gas that flows from the through-holes 15a and 15b in this way flows so as to turn around the center axis of the pipe 3 from the tangential direction, so that the swirl flow is generated around the center axis inside the pipe 3. Then, a reduction agent is injected from the injection device 13 into the swirl flow of the exhaust gas so as to be added thereto, so that ammonia is produced by the thermal decomposition reaction and the hydrolysis reaction.

At this time, as described above, since the guide member 16a covers the upstream side of the reduction agent injection area A in the axial direction of the first casing 2, it is possible to suppress the exhaust gas from directly entering the injection area A and to suppress the injected reduction agent from flowing by the flow of the exhaust gas. As a result, the injected reduction agent is sufficiently mixed with the exhaust gas while the shape of the injection area A is satisfactorily maintained and the injected reduction agent is nebulized (atomized) without adhering to the inner wall surface of the pipe 3.

Subsequently, as illustrated in FIG. 1, the exhaust gas including ammonia flows into the second casing 4, and NOx in the exhaust gas is purified while being selectively reduced by the SCR 14. Then, the exhaust gas is supplied to the ammonia reduction catalyst at the rear stage.

As described above, according to the embodiment, it is possible to diffuse the reduction agent by generating the swirl flow in the exhaust gas by the guide members 16a, 16b, and 16c and to suppress the exhaust gas from directly entering the reduction agent injection area A by the guide member 16a. For this reason, it is possible to suppress a problem in which the reduction agent injected from the injection device 13 flows by the flow of the exhaust gas so that the reduction agent adheres to the inner wall surface of the pipe 3. Accordingly, it is possible to sufficiently diffuse the reduction agent.

Further, in the embodiment, since the through-holes 15a and 15b through which the exhaust gas flows into the pipe 3 are formed at two positions, a sufficient opening area may be ensured, and hence the pressure (back pressure) of the exhaust gas may be reduced. In addition, since the exhaust gas is guided by the guide members 16a, 16b, and 16c toward the pair of through-holes 15a and 15b, the swirl flows may be generated in the same direction inside the pipe 3, and hence the swirl flow generated in the exhaust gas may be promoted. Accordingly, the reduction agent diffusion efficiency may be improved. That is, it is desirable that the through-holes be formed at two facing positions and the turning guide members guide the exhaust gas to the through-holes from the tangential direction of the pipe so as to generate the swirl flows in the same direction inside the pipe. In this way, since a sufficient opening area may be ensured compared to the case where the through-hole is formed at one position, the pressure (back pressure) of the exhaust gas may be reduced. In addition, since the exhaust gas is guided to the pair of through-holes by the turning guide members, the swirl flows may be generated in the same direction inside the pipe, and hence the swirl flow generated in the exhaust gas may be promoted. Accordingly, the reduction agent diffusion efficiency may be improved.

Further, in the embodiment, since the through-holes 15a and 15b are formed at the upstream side in relation to the matching position between the reduction agent injection area A and the inner wall surface 3a of the pipe 3, the swirl flow may be generated so as to surround the reduction agent injection area A by the exhaust gas flowing into the pipe 3, and hence the reduction agent may be further diffused. In addition, since the swirl flow may be generated in the exhaust gas by causing the exhaust gas to flow into the pipe 3 from the further upstream side, the reduction agent may be diffused directly after the injection. That is, it is desirable that the through-hole be formed at a position located at the upstream side of the matching position between the inner wall surface of the pipe and the injection area of the reduction agent injected from the injection device. In this way, since it is possible to generate the swirl flow so as to surround the reduction agent injection area by the exhaust gas flowing into the pipe, it is possible to further diffuse the reduction agent. Further, since it is possible to generate the swirl flow in the exhaust gas by causing the exhaust gas to flow into the pipe from the further upstream side, it is possible to diffuse the reduction agent directly after the injection.

While the preferred embodiment of one aspect of the invention has been described, the invention is not limited to the above-described embodiment. For example, the invention may be modified within a scope without departing from the spirit of claims and may be applied to the other embodiments.

Figure 4:
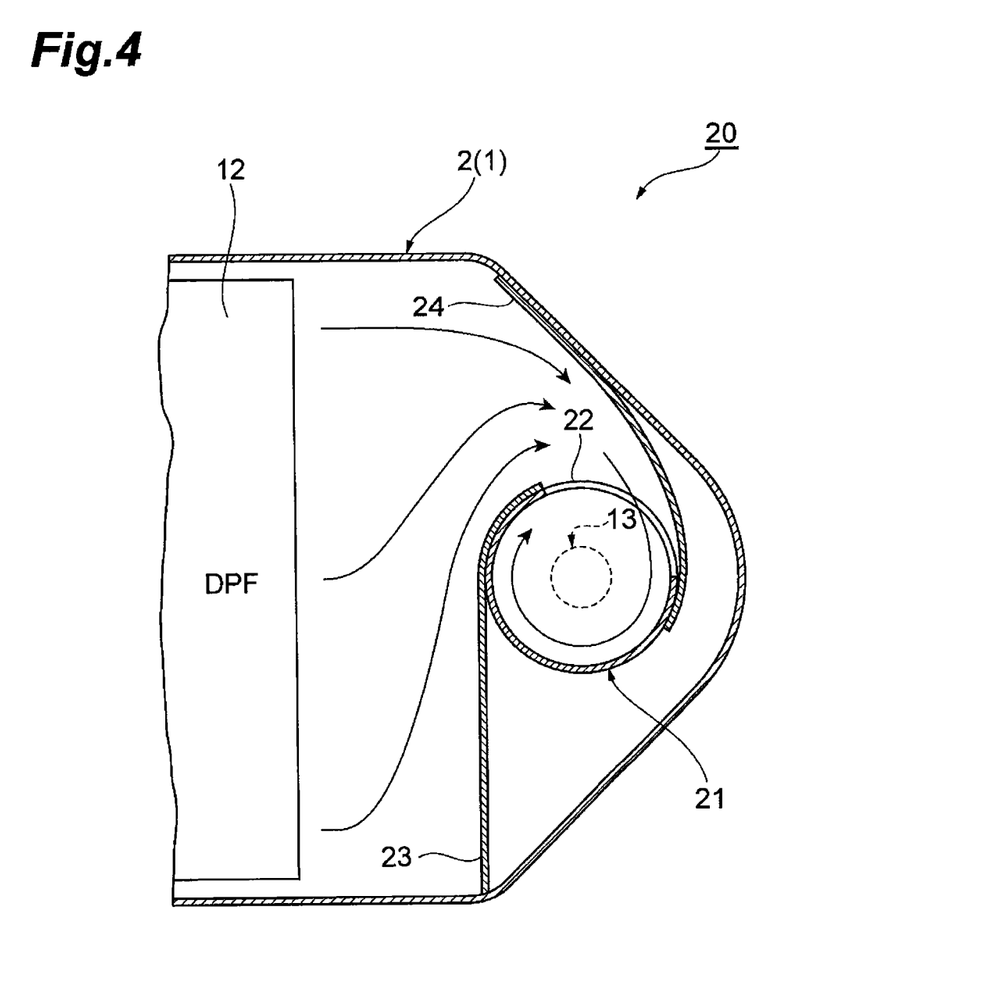
FIG. 4 illustrates a modified example of a guide member of the exhaust gas purification device of FIG. 1, and is a cross-sectional view taken along the line II-II of FIG. 1.

For example, in the above-described embodiment, a case has been described in which three through-holes are formed and three guide members are used, but the number of the through-holes or the guide members is not particularly limited. For example, as in an exhaust gas purification device 20 illustrated in FIG. 4, a configuration may be employed in which a pipe 21 is provided with one through-hole 22 and two guide members 23 and 24 are provided so as to guide the exhaust gas to the through-hole 22. In this case, one guide member 23 may serve as a turning guide member that guides the exhaust gas to the through-hole 22 from the tangential direction of the pipe 21 so as to generate the swirl flow inside the pipe 21, and the other guide member 24 may serve as a protecting guide member that covers the upstream side of the reduction agent injection area A in the axial direction of the first casing 2.

Further, in the above-described embodiment, a case has been described in which the guide member 16a serves as the turning guide member and the protecting guide member, and the guide members 16b and 16c serve as only the turning guide member. However, both functions may be provided in one guide member or both functions may be distributed to two or more guide members as long as the exhaust gas purification device may have the functions of the turning guide member and the protecting guide member as a whole.

Further, in the above-described embodiment, a truck is exemplified as the vehicle, but for example, a bus, a tractor, or the other vehicles may be exemplified. Furthermore, in the description above, the term of "substantially" allows the error in manufacture or design.

INDUSTRIAL APPLICABILITY

The invention may be used as the exhaust gas purification device.

REFERENCE SIGNS LIST 1 exhaust passage
2 first casing (casing)
3 pipe
3a inner wall surface
4 second casing
10 exhaust gas purification device
13 injection device
13a nozzle
15a, 15b through-hole
16a, 16b, 16c guide member
20 exhaust gas purification device
21 pipe
22 through-hole
23, 24 guide member
A injection area

The invention claimed is:

1. An exhaust gas purification device that purifies an exhaust gas flowing through an exhaust passage of an engine, the exhaust gas purification device comprising:
a tube-shaped casing including an upstream side and a downstream side with reference to an axial direction of the casing;
a pipe disposed at the downstream side of the casing, inserted into the casing so as to extend in a direction substantially perpendicular to the axial direction of the casing, and is provided with a through-hole communicating with the casing;
a guide member for guiding the exhaust gas inside the casing to the through-hole; and
an injection device for injecting into the pipe a reduction agent from an upstream end of the pipe,
wherein the guide member includes turning guide members guiding the exhaust gas to the through-hole from a tangential direction of the pipe so as to generate a swirl flow inside the pipe and a protecting guide member covering an upstream side of an injection area of the reduction agent in the axial direction of the casing,
wherein the protecting guide member extends in an axial direction of the pipe and includes a convex exterior surface substantially facing the upstream side of the casing and a concave interior surface substantially facing the downstream side of the casing, and wherein the turning guide members each include a concave surface substantially facing the upstream side of the casing.

2. The exhaust gas purification device according to claim 1,
wherein the through-hole includes two through-holes formed at two facing positions, and
wherein the turning guide members guide the exhaust gas to the through-holes so as to generate inside the pipe the swirl flows in the same direction.

3. The exhaust gas purification device according to claim 2,
wherein the through-holes are formed at the upstream side of a position where the injection area of the reduction agent injected from the injection device and an inner wall surface of the pipe meet.

4. The exhaust gas purification device according to claim 1, wherein the turning guide members extend in the axial direction of the pipe.

5. The exhaust gas purification device according to claim 1, wherein the protecting guide member covers an upstream side of the through-hole in the axial direction of the casing and at least one of the turning guide members cover a downstream side of the through-hole in the axial direction of the casing.

* * * * *